(12) United States Patent  (10) Patent No.: US 8,251,019 B2
Hultgren  (45) Date of Patent: Aug. 28, 2012

(54) CAN THE BARKING DOG SYSTEMS

(75) Inventor: Christine Hultgren, Wellington, FL (US)

(73) Assignee: Christine Hultgren, Wellington, FL (US)

( * ) Notice: Subject to any disclaimer, the term of this patent is extended or adjusted under 35 U.S.C. 154(b) by 193 days.

(21) Appl. No.: 12/857,491

(22) Filed: Aug. 16, 2010

(65) Prior Publication Data

US 2011/0107980 A1  May 12, 2011

Related U.S. Application Data

(60) Provisional application No. 61/259,682, filed on Nov. 10, 2009.

(51) Int. Cl.
*A01K 15/02* (2006.01)
(52) U.S. Cl. .......................... 119/719; 119/905; 446/419
(58) Field of Classification Search .................. 119/719, 119/712, 718, 702, 905; 446/397, 404, 406, 446/419
See application file for complete search history.

(56) References Cited

U.S. PATENT DOCUMENTS

| | | | |
|---|---|---|---|
| 2,839,242 A | 6/1958 | Meistre et al. | |
| 3,315,640 A * | 4/1967 | Gamble | 119/707 |
| 3,570,457 A | 3/1971 | Curtis | |
| D234,789 S | 4/1975 | Rosenberg | |
| 4,720,283 A * | 1/1988 | Williams et al. | 446/69 |
| 4,957,057 A | 9/1990 | Marcucci | |
| 7,069,878 B2 * | 7/2006 | Mugford | 119/712 |
| 7,334,541 B2 * | 2/2008 | Reiter | 119/712 |
| 7,674,153 B2 * | 3/2010 | King | 446/415 |
| 2004/0118361 A1 * | 6/2004 | Mugford | 119/712 |
| 2004/0134434 A1 * | 7/2004 | Kraft et al. | 119/51.01 |
| 2005/0183674 A1 * | 8/2005 | Zutis et al. | 119/719 |
| 2007/0039563 A1 | 2/2007 | Keller | |
| 2008/0072842 A1 * | 3/2008 | King | 119/719 |
| 2008/0083378 A1 | 4/2008 | Pearce | |
| 2009/0020077 A1 * | 1/2009 | Macrae | 119/719 |
| 2010/0095896 A1 * | 4/2010 | Van Wye | 119/57.92 |

* cited by examiner

*Primary Examiner* — Yvonne Abbott
(74) *Attorney, Agent, or Firm* — RG Patent Consulting LLC

(57) ABSTRACT

Can the Barking Dog is an audible device that individuals can use to train their dogs to refrain from barking uncontrollably. This item comprises a small metal aluminum container that has loose material (media) inside to create a jarring audible noise. Users simply shake the device creating a noise that stops a dog from barking. The container may be coated in rubber for increased durability. The device may have a wrist loop attached to the top making it easy for users to carry the device while walking a dog. The loose materials may be metal marbles or other items that create a metal-on-metal sound that is effective in capturing a dog's attention. The device may be designed with a button-operated component that compresses the loose material allowing users to silence the device in between uses. Further, the dog-bark inhibiting and training device includes a kit and a method of use.

15 Claims, 4 Drawing Sheets

CAN THE BARKING DOG SYSTEMS

CROSS-REFERENCE TO RELATED APPLICATION

The present application is related to and claims priority from prior provisional application Ser. No. 61/259,682, filed Nov. 10, 2009 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

The present invention relates generally to the field of training devices and more specifically relates to a dog-bark inhibiting and training device.

2. Description of the Related Art

It may be difficult for dog owners or trainers to find an effective method for deterring a dog from excessively barking. Some dogs may be stubborn and difficult to train but the option of allowing them to continually bark or bark uncontrollably when a person comes to the door is simply unreasonable. Many dog owners feel shock collars are an excessive use of force and would prefer a gentler method. Consumers need a humane but effective method for training their dogs to prevent their dogs from barking when such barking may be not desirable.

Various solutions have been proposed for the aforementioned problems such as those found in U.S. Pat. Nos. 3,570,457, 2007/0039563, 2008/0083378, 4,957,057, 2,839,242, and D234,789. Although these patents address some of the problems stated previously, they fail to provide an audible sound that is reliable for quieting a dog upon use.

Ideally, a can the barking dog system for dog-bark inhibiting and training should be safe, user-friendly, and manufactured at a modest expense. Further, the can the barking dog device be aesthetically pleasing and reliably cause a dog to refrain from barking immediately upon use. Thus, a need exists for a Can the barking dog system to avoid the above-mentioned problems.

BRIEF SUMMARY OF THE INVENTION

In view of the foregoing disadvantages inherent in the known dog training devices art, the present invention provides a novel Can the barking dog system for quieting a barking dog upon use.

Can The Barking Dog is a device dog owners can use to quiet their barking dog. This item can be used to create an audible sound that causes a dog to cease their barking upon hearing it. Owners and trainers can use this humane method to teach their animals not to bark when a person comes to the door or while out on a walk. It is easy to use and does not shock or otherwise physically harm the dog. Dog owners and/or trainers may derive benefit from this convenient device.

The present invention holds significant improvements and serves as a can the barking dog system. These and other features, aspects, and advantages of the present invention will become better understood with reference to the following drawings and description.

BRIEF DESCRIPTION OF THE DRAWINGS

The figures which accompany the written portion of this specification illustrate embodiments and method(s) of use for the present invention, Can the barking dog system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a dog-bark inhibiting and training device and more particularly to can the barking dog system 100 as used to quiet the barking of at least one dog 102. Can the Barking Dog System 100 is an audible device that individuals can use to train their dogs 102 to refrain from barking uncontrollably.

Figure 1A:
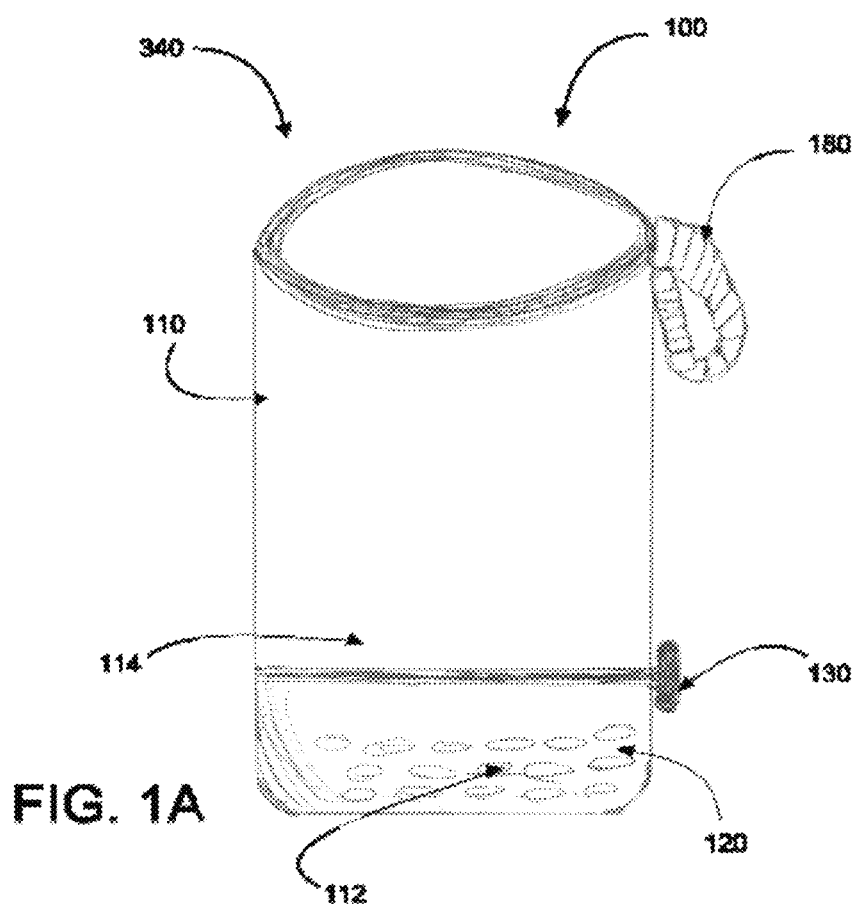
FIGS. 1A and 1B show a perspective view illustrating can the barking dog system in an 'in-use' condition according to an embodiment of the present invention.
Figure 1B:
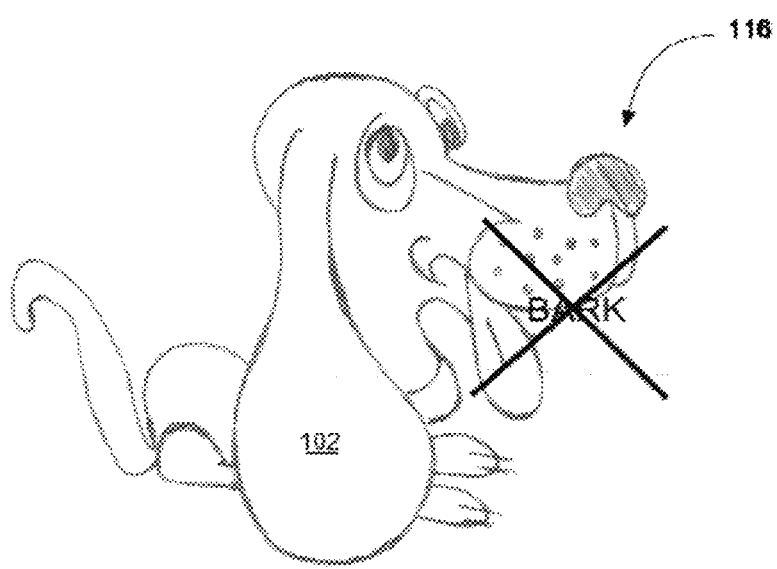
Figure 2:
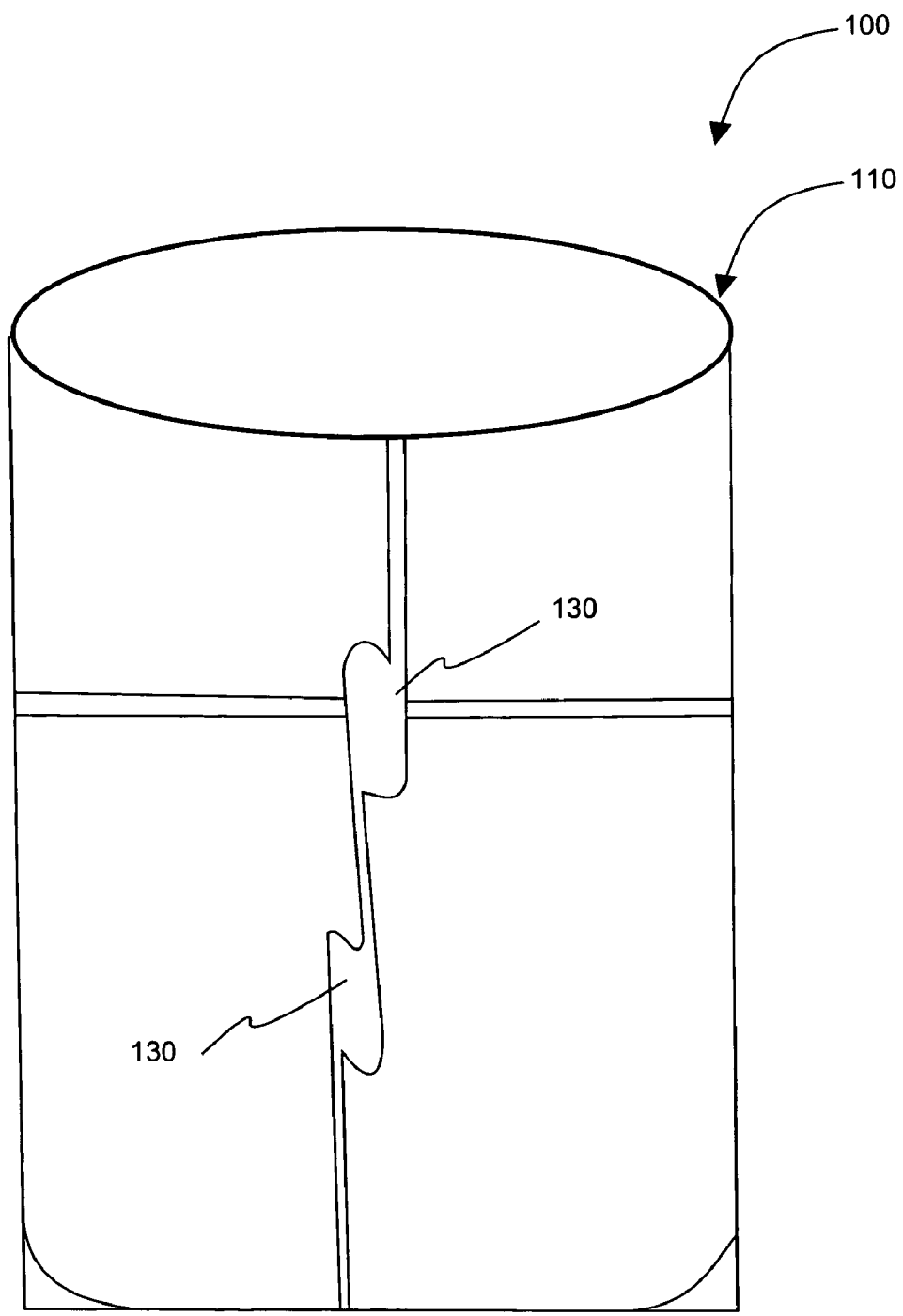
FIG. 2 is a perspective view illustrating a container device of the can the barking dog system according to an embodiment of the present invention of FIG. 1.

Referring now to FIGS. 1 and 2, showing perspective views illustrating can the barking dog system 100 according to embodiments of the present invention, FIG. 1 showing can the barking dog system 100 in an 'in-use' condition and FIG. 2 illustrating container 110 of can the barking dog system 100.

Can the barking dog system 100 preferably includes container 110 having at least one inner volume 114, a shakable media 120, compressible lock button for sound adjustment 130, and an elastic wrist bracelet 180. Container 110 preferably comprises aluminum because it is cost-effective and lightweight. Further in a preferred embodiment, container 110 comprises a rubber coating to increase durability and strength of can the barking dog system 100. Rubber coating may be present on the inside and/or outside of container 110 to promote longevity of can the barking dog system 100. Container 110 is preferably small and made of aluminum (lightweight), such that it is easily hand-held via at least one user (child or adult).

Shakable media 120 within container 110 comprises a noise-generating means such as at least one marble 114 or at least one ball-bearing 112. Shakable media 120 is enclosed substantially within inner volume 114 of container 110. When the present invention is shook shakable media 120 collides with itself creating a noise such that dogs 102 are sufficiently irritated, but not harmed physically in any way and stop barking as a result. Compressible lock button 130 located on container 110 is preferably lockable during non-use periods and adjustable for sound adjustment 130 during in-use periods. Compressible lock button 130 is preferably spring-activated and may be used to compress shakable media 120. When compressible lock button 130 is locked shakable media 120 is confined and effectively restrained from moving in container 110. In this way shakable media 120 is located inside inner volume 114 of container 110 and shakable media 120 is sound-adjustable using compressible lock button 130 and compressible lock button 130 is used to compress shakable media 120. Sound adjustment means comprises slots for compressible lock button 130 to be moved into and out of. Further, in certain embodiments elastic wrist bracelet 180 is preferably attached to the top of container 110 via at least one fastening means making it easy for users to carry the device while walking dog(s) 102. In these ways the present invention is easy to use, cost-effective to manufacture and reliable in use.

Figure 3:
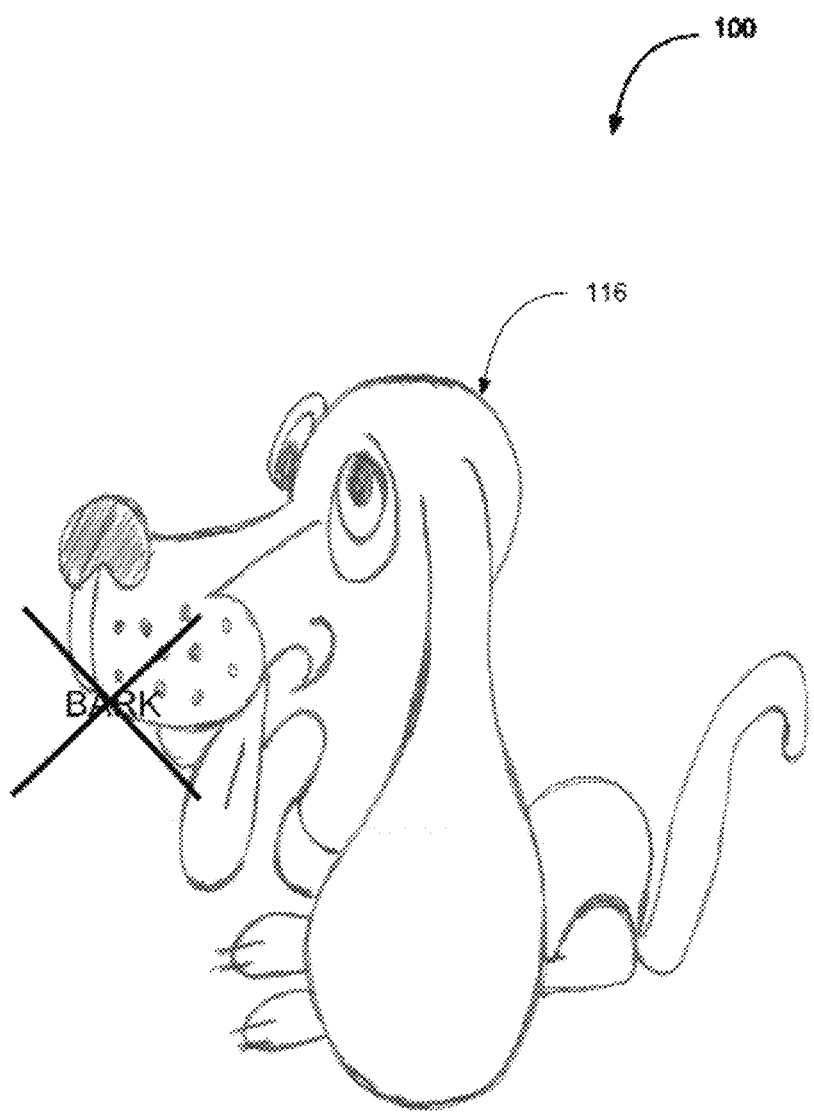
FIG. 3 is a perspective view illustrating a logo of the can the barking dog system according to an embodiment of the present invention of FIG. 1.

Referring now to FIG. 3, showing perspective view illustrating logo 116 of can the barking dog system 100 according to an embodiment of the present invention of FIG. 1.

Container 110 of can the barking dog system 100 comprises at least one logo 116, as shown however logo 116 is exemplary and other versions of indicia may be used and still be considered within the scope of the present invention. Logo 116 may be strategically placed on the exterior of container 110. Logo 116, as shown may be used in conjunction with Can the barking dog system 100 according to an embodiment of the present invention of FIGS. 1-3 to market the product. Can the barking dog system 100 may comprise kit 340. Kit 340 may comprise the following parts: container 110; elastic wrist bracelet 180; shakable media 120 comprising marbles or ball-bearings 112; spring-activated compressible lock button 130; and a set of user instructions. Kit 340 may be manufactured and provided for sale in a wide variety of sizes and shapes for a wide assortment of applications. Further, the various components may be interchangeable between kits 340. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, magnetic means, different logos/indicia, parts may be sold separately, etc., may be sufficient.

Figure 4:
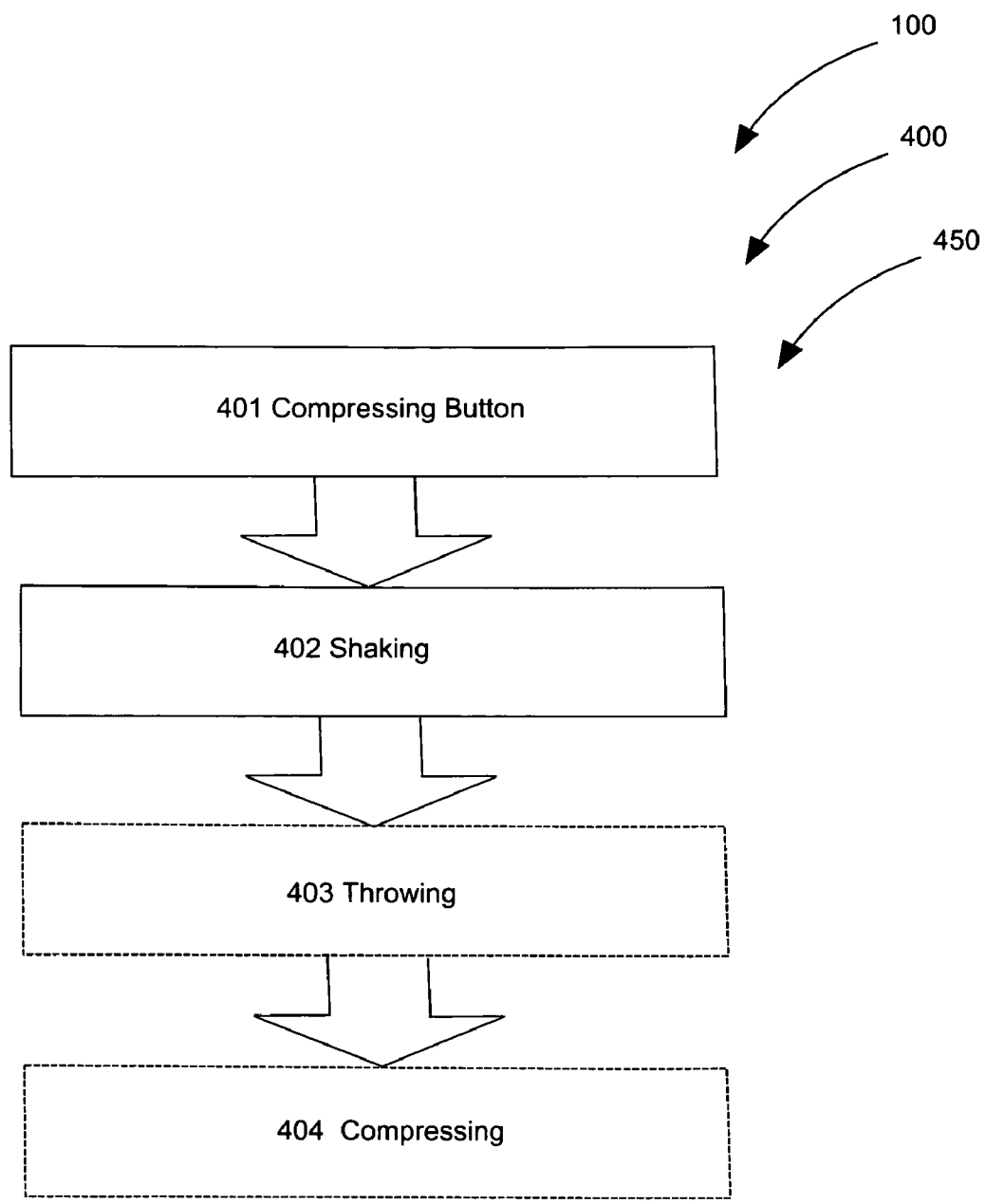
FIG. 4. is a flowchart illustrating a method of use according to an embodiment of the present invention of FIGS. 1-3.

Referring now to FIG. 4 showing flowchart 450 illustrating a method of use 400 according to an embodiment of the present invention of FIGS. 1-3.

In accordance with the embodiments of the present invention a preferred method of use 400 is disclosed herein comprising: step one 401 compressing sound-adjusting button 130 to release shakable media 120 within an inner volume 114 of container 110; step two 402 shaking shakable media 120 inside container 110 thereby creating a dog-bark inhibiting means; step three 403 may optionally include throwing container 110; and step four 404 compressing shakable media 110 for non-use periods. Optional steps 403 and 404 are designated by dotted lines in flowchart 450 illustrating method of use 400.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain exercise or storing steps, including or excluding certain steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention.

What is claimed is new and desired to be protected by Letters Patent is set forth in the appended claims:

1. A dog-bark inhibiting and training device comprising:
   a container having at least one inner volume;
   a shakable media; and
   a compressible lock button for sound adjustment;
   wherein said shakable media is located inside said inner volume of said container and said shakable media is sound-adjustable using said compressible lock button.

2. The dog-bark inhibiting and training device of claim 1 wherein said container comprises aluminum.

3. The dog-bark inhibiting and training device of claim 2 wherein said container further comprises a rubber coating.

4. The dog-bark inhibiting and training device of claim 1 further comprises an elastic wrist bracelet.

5. The dog-bark inhibiting and training device of claim 1 wherein said shakable media comprises at least one marble.

6. The dog-bark inhibiting and training device of claim 1 wherein said shakable media comprises at least one ball-bearing.

7. The dog-bark inhibiting and training device of claim 6 wherein said shakable media comprises a noise-generating means.

8. The dog-bark inhibiting and training device of claim 1 wherein said compressible lock button is spring-activated.

9. The dog-bark inhibiting and training device of claim 1 wherein said compressible lock button is used to compress said shakable media.

10. The dog-bark inhibiting and training device of claim 1 wherein said container comprises at least one logo.

11. A dog-bark inhibiting and training device comprising:
    an aluminum container having a rubber coating, at least one indicia, and at least one inner volume;
    an elastic wrist bracelet;
    a shakable media comprising a plurality of ball-bearings to provide a noise-generating means; and
    a spring-activated compressible lock button with slots for sound adjustment;
    wherein said shakable media is located inside said inner volume of said container and said shakable media is sound-adjustable using said compressible lock button and said compressible lock button is used to compress said shakable media.

12. The dog-bark inhibiting and training device of claim 11 further comprising a kit including: said container; said elastic wrist bracelet; said shakable media comprising marbles and/or said ball-bearings; said spring-activated compressible lock button; and a set of user instructions.

13. A method of using a dog-bark inhibiting and training device comprising the steps of:
    compressing a sound-adjusting button to release a shakable media within an inner volume of a container;
    shaking said shakable media inside said container thereby creating a dog-bark inhibiting means.

14. The method of using said dog-bark inhibiting and training device of claim 13 further comprising the step of throwing said container.

15. The method of using said dog-bark inhibiting and training device of claim 13 further comprising the step of compressing said shakable media for non-use periods.

* * * * *